United States Patent
Herrington et al.

(10) Patent No.: US 7,326,330 B2
(45) Date of Patent: Feb. 5, 2008

(54) METHOD AND APPARATUS FOR SCALE AND BIOFILM CONTROL

(75) Inventors: Rodney E. Herrington, Albuquerque, NM (US); Michael Fraim, Albuquerque, NM (US)

(73) Assignees: MIOX Corporation, Albuquerque, NM (US); ABQ UV Pollution Solutions, Inc., Albuquerque, NM (US)

( * ) Notice: Subject to any disclaimer, the term of this patent is extended or adjusted under 35 U.S.C. 154(b) by 0 days.

(21) Appl. No.: 11/149,740

(22) Filed: Jun. 9, 2005

(65) Prior Publication Data

US 2005/0274602 A1    Dec. 15, 2005

Related U.S. Application Data

(60) Provisional application No. 60/579,053, filed on Jun. 10, 2004.

(51) Int. Cl.
*B01D 17/00*    (2006.01)
*C25F 7/00*    (2006.01)

(52) U.S. Cl. .................. 205/769; 205/759; 210/748; 210/758; 210/763; 210/764; 210/205; 422/186.3

(58) Field of Classification Search ............... 205/745, 205/769, 759; 210/748, 758, 763, 764, 205; 422/186.3
See application file for complete search history.

(56) References Cited

U.S. PATENT DOCUMENTS

| | | | |
|---|---|---|---|
| 6,117,337 A | * | 9/2000 | Gonzalez-Martin et al. 210/748 |
| 2004/0050682 A1 | * | 3/2004 | Paskalov et al. .......... 204/157.15 |
| 2005/0269521 A1 | * | 12/2005 | Zagrobelny ................ 250/435 |

* cited by examiner

*Primary Examiner*—Bruce F. Bell
(74) *Attorney, Agent, or Firm*—Philip D. Askenazy; Peacock Myers, P.C.

(57) ABSTRACT

Method and apparatus for electrolytically controlling the formation of scale and biofilm in water purification and other systems. An anode is deposited on or disposed on or adjacent to a surface, such as that of a quartz UV tube, providing a low pH environment which inhibits the formation of carbonate scale and biofilm.

42 Claims, 6 Drawing Sheets

METHOD AND APPARATUS FOR SCALE AND BIOFILM CONTROL

CROSS-REFERENCE TO RELATED APPLICATIONS

This application claims the benefit of the filing of U.S. Provisional Patent Application Ser. No. 60/579,053, entitled "Method and Apparatus for Scale and Biofilm Control", filed on Jun. 10, 2004, and the specification thereof is incorporated herein by reference.

BACKGROUND OF THE INVENTION

1. Field of the Invention (Technical Field)

The present invention is an electrolytic method and apparatus for desolving carbonate scale and preventing biofilm formation on surfaces.

2. Background Art

Note that the following discussion refers to a number of publications and references. Discussion of such publications herein is given for more complete background of the scientific principles and is not to be construed as an admission that such publications are prior art for patentability determination purposes.

Calcium carbonate formation and biofilm growth on surfaces of process equipment, piping systems, and other applications is a leading cause of maintenance and operational failure of these systems. As an example, ultraviolet light (UV) systems have proven to be very effective for destruction of microorganisms, organics, chemicals, and other compounds in fluid treatment systems, notably, water treatment systems. In nutrient rich environments, UV provides an excellent energy source for growth of biofilms and algae on UV quartz tubes. Many systems today utilize expensive scraper mechanisms for wiping the quartz tubes to clean carbonate scale and biofilm from the quartz tube surfaces. U.S. Pat. No. 5,874,740 by Ishiyama describes such a scraper system for cleaning an ultraviolet tube.

Electrolytic technologies utilizing dimensionally stable anodes have been developed to produce mixed-oxidants and sodium hypochlorite solutions from a sodium chloride brine solution. Dimensionally stable anodes are described in U.S. Pat. No. 3,234,110 to Beer, entitled "Electrode and Method of Making Same," wherein a noble metal coating is applied over a titanium substrate. In the 1990s, research by Dr. Greg Swain at Michigan State University has demonstrated that diamond coated electrodes offer significant improvements in durability over conventional dimensionally stable anodes. U.S. Pat. No. 4,761,208 by Gram, et al describes an electrolytic method and cell for sterilizing water. An electrolytic process can be used to produce these oxidants from aqueous solutions having a wide range of total dissolved solids in solution.

Furthermore, U.S. Pat. No. 5,308,507 by Robson describes a mixed-oxidant generation method and apparatus for removing organic contaminants utilizing a combination of mixed-oxidants and ultraviolet light. It is well known that the oxidant solution produced at the anode of the electrolytic cell has a low pH value, typically in the range of 2 to 3 pH. The cathode surface typically has a high pH value at the surface, usually in the range of 12 to 13 pH. It is also well known that calcium carbonate scale formation cannot occur at the anode due to the low pH conditions at the anode surface. However, calcium carbonate scale formation can occur at the cathode surface, particularly if calcium is present in the water as an ion flowing through the electrolytic cell. Some electrolytic cells, particularly those used for swimming pool applications, utilize this feature to de-scale the cathode by periodically reversing the polarity of the cell electrodes, effectively changing the cathode to the anode. A low pH acidic solution now formed at the surface of the anode (formerly the calcium carbonate-loaded cathode) dissolves the calcium carbonate.

This electrolytic oxidant feature of generating a low pH condition at the anode can be utilized to prevent scale buildup at the surface of UV tubes and other process equipment.

SUMMARY OF THE INVENTION
(DISCLOSURE OF THE INVENTION)

The present invention is an apparatus for reducing carbonate scale formation on a surface, the apparatus comprising an object; a power supply; a contaminated fluid; a cathode; and an anode disposed on or near a surface of the object; wherein the anode produces a low pH environment in the fluid at the surface. The object preferably comprises a UV element, preferably a quartz tube, or optionally a sensor. The anode is preferably wrapped around the object and preferably comprises a spirally wrapped wire. The cathode optionally comprises a housing, or preferably comprises a spirally wrapped wire. The cathode is optionally separated from the anode by one or more nonconductive spacers. The anode optionally comprises a conductive, preferably UV-transparent material deposited on the surface, for example diamond.

The fluid preferably comprises an aqueous solution. The apparatus is preferably useful for preventing the formation of a biofilm on the surface. The object is optionally oriented transverse to a flow direction of the fluid, wherein the anode is preferably disposed parallel to and upstream of the object and an acidic solution produced at the anode is preferably washed around the object. The apparatus optionally further comprises a second cathode at a voltage different than a voltage of the anode and a voltage of the cathode.

The present invention is also a method for reducing carbonate scale formation on a surface, the method comprising the steps of providing a cathode; disposing an anode on or near a surface of an object; contacting the anode and the surface with a contaminated fluid; purifying the fluid; and producing a low pH environment in the fluid in the vicinity of the anode. The method preferably further comprises one or more of the step of inhibiting formation of carbonate scale on the surface, the step of removing carbonate scale from the surface, or the step of inhibiting formation of a biofilm on the surface. The fluid preferably comprises an aqueous solution. The purifying step preferably comprises treating the fluid with UV radiation and/or treating the fluid with oxidants produced by an electrolytic reaction. The disposing step preferably comprises wrapping a wire anode on the surface, or optionally comprises depositing the anode, preferably a conductive UV-transparent material, preferably diamond, directly on the surface.

The method preferably further comprises the step of separating the cathode and the anode with a nonconductive spacer. The producing step is optionally performed as part of a cleaning cycle. The method preferably further comprises the step of reversing the polarity of the anode and the cathode, preferably to remove scale from the cathode. The object preferably comprises a UV tube. The method preferably further comprises the steps of orienting the object transverse to a flow direction of the fluid, disposing the anode parallel to and upstream of the object, and washing an acidic solution produced at the anode around the object. The method preferably further comprises the steps of providing a second cathode at a voltage different than a voltage of the anode and a voltage of the cathode and reversing the polarity of the cathode and the second cathode.

An object of the present invention is to provide an apparatus and method for destroying or preventing the formation of carbonate scale and biofilms on the surface of process equipment, pipes, or other devices that rely on clean surfaces to operate effectively.

Another object of the present invention is to inhibit carbonate or biofilm formation in potable water, wastewater, chemical processing, heat exchanger, and other equipment.

A primary advantage of the present invention is that it provides a continuous process for preventing scale, biofilms, algae and other undesirable materials from forming on the surface of process equipment without the need for performing periodic maintenance, shutting down valuable process equipment for service, or incurring large labor costs for maintaining equipment.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

BEST MODES FOR CARRYING OUT THE INVENTION

Figure 1:
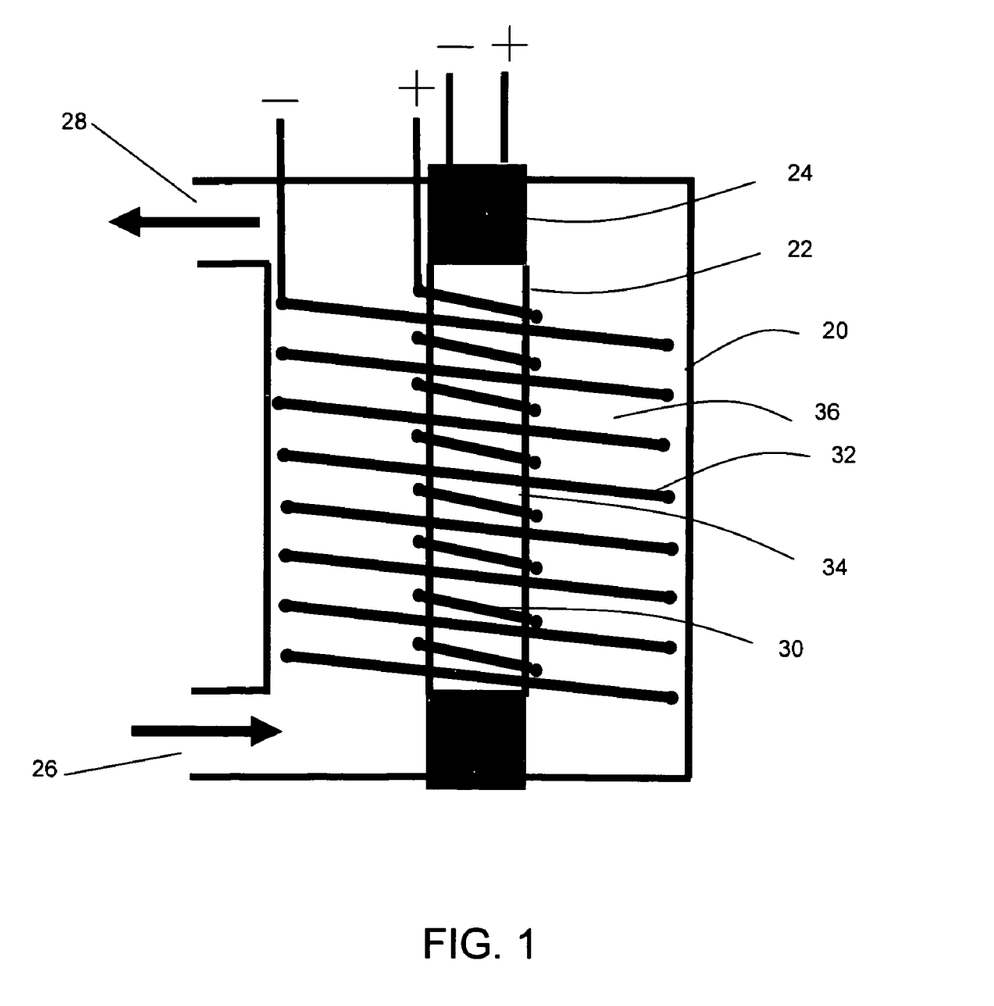
FIG. 1 is a cross-section of a preferred embodiment of the present invention of an annular UV reactor with a center UV tube and outer housing.

A preferred embodiment of the present invention is shown in FIG. 1. The ultraviolet light (UV) reactor preferably comprises tubular UV quartz element 22, which preferably is centrally located within annular reactor housing 20. Element 22 is preferably powered by electrical power circuit 24. Electrolytic anode wire 30 is preferably spirally wrapped around element 22. Electrolytic cathode wire 32 is preferably spirally wrapped within annular reactor housing 20 forming annular space 36 between electrolytic anode wire 30 and electrolytic cathode wire 32. Optionally a set of electrolytic cathode wires 32 is used. Raw untreated or otherwise contaminated water or other fluid enters annular reactor housing 20 through inlet port 26, and treated water is discharged from exit port 28. The solution to be treated preferably flows longitudinally in annular space 36.

The appropriate power is applied to the anode and cathode wires to set up an electrolytic field to produce a low pH oxidant solution at the anode, and a high pH solution in proximity to the cathode wire or wires. Low pH acidic conditions stimulated by the electrolytic reaction thus occur at surface 34 of element 22. The acidic conditions at surface 34 preclude formation of calcium carbonate (or other forms of carbonates), or dissolve carbonate scale which has already formed, thereby keeping surface 34 clean so that UV radiation is not blocked by calcium carbonate scale and UV energy is efficiently transferred to the water or other fluid. UV energy destroys microorganisms and biofilms at surface 34 as well as in the water to be treated in annular space 36. Microorganism and organic destruction is further facilitated by production of oxidants in close proximity to electrolytic anode wire 30. Oxidants are further diffused into the bulk solution within annular space 36 providing additional disinfection or organic destruction for the solution to be treated. The combination of UV radiation and oxidants, preferably mixed oxidants, generated by the anode surface in the aqueous stream ensures organisms are destroyed and biofilm and algae are prevented from forming on the UV tube. This process is very effective for maintaining clean UV tubes with no maintenance for periods greater than one year.

Figure 2:
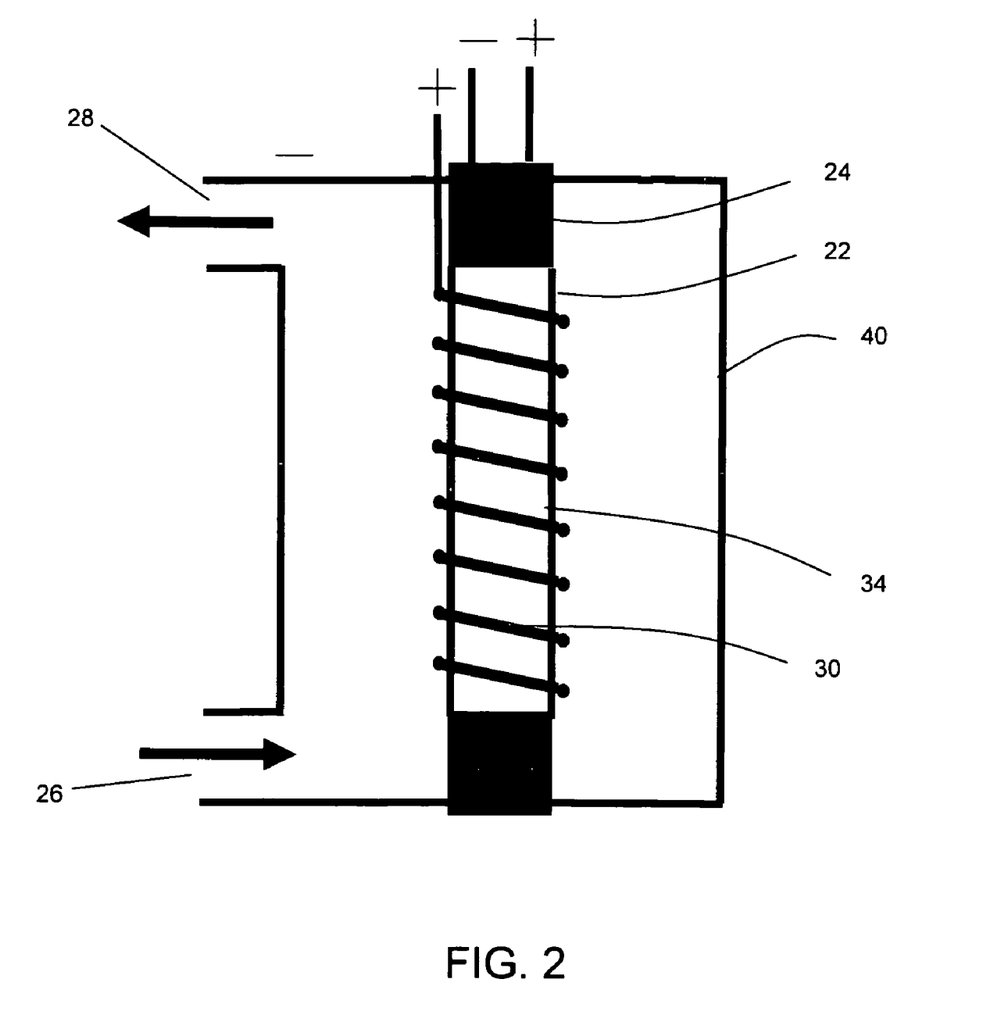
FIG. 2 is a cross-section of an alternative embodiment of the present invention of an annular UV reactor with a center UV tube and outer housing performing as both the outer housing and cathode element.

In an alternative embodiment of the present invention, shown in FIG. 2, annular reactor housing 40 comprises a metal suitably compatible with an electrolytic cell. Examples of compatible materials include titanium, Hastalloy, stainless steel, or other electrically conductive materials. In this embodiment, annular reactor housing 40 acts as the cathode, thereby eliminating the need for a separate cathode wire. In this configuration, direct current electrical power is preferably applied to anode wire 30 and directly to annular reactor housing 40, which acts as the cathode. This embodiment is most useful for treating relatively soft flowing water or aqueous solution, where the pH on the cathode surface does not rise above approximately 8.3 to 8.4, the scaling point of calcium salts, due to the amperage being less than approximately 0.13 amps per inch of cathode surface area. With the pH below the scaling point, the cathode surface can remain clean for months of service. When the cathode surface begins to scale over, it is preferably cleaned with a dilute acidic solution.

Figure 3:
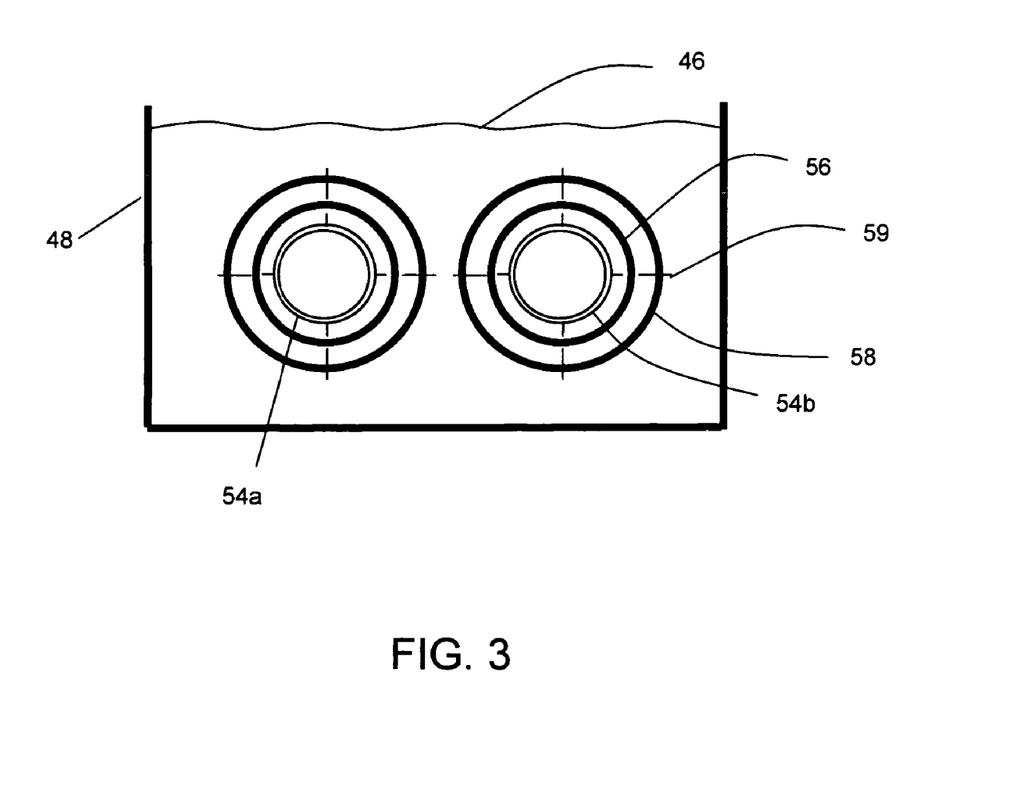
FIG. 3 is a cross-section of an alternative embodiment of the present invention of a channel or trough with multiple UV elements with anode electrodes immediately adjacent to the UV elements and cathode electrodes supported by non-conductive spacers.

Another alternative embodiment of the present invention is shown in FIG. 3, which is a cross section of a contaminated fluid 46 flowing within trough 48. Two or more UV element quartz tubes 54a, 54b are preferably aligned in parallel within trough 30. Anode wire 56 is preferably spirally wrapped immediately adjacent to quartz tubes 54a, 54b. Cathode wire 58 is spirally wrapped outside the circumference of anode wire 56, preferably concentrically, and is supported by non-electrically conductive spacers 59. Spacers 59 can be supported from quartz tubes 54a, 54b or from anode wire 56. Optionally a set of cathode wires may be used. Cathode wires 38 may optionally be replaced with longitudinal plates within trough 48, or trough 48 may optionally be constructed of suitable electrically conductive material to act as the cathode in the process. The use of open flow spacers allows contaminated fluid 46 to be treated in open trough 48 or a large pipe with multiple UV tubes within the trough or pipe.

Figure 4:
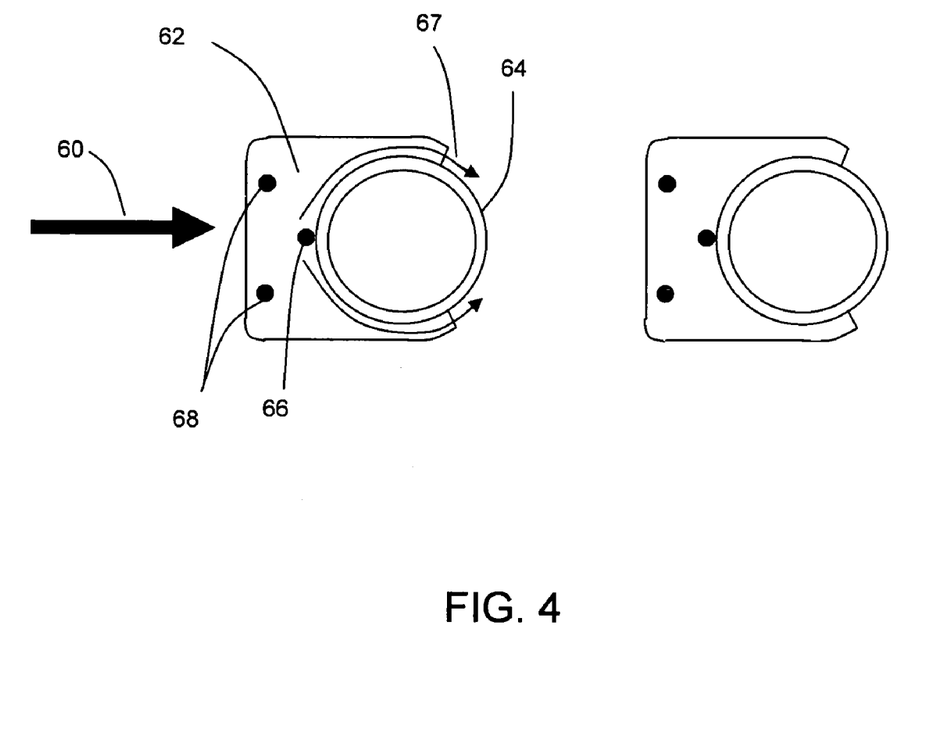
FIG. 4 shows a configuration of UV tubes comprising anode and cathode wires mounted crossflow (or tangent) to the fluid flow stream.

In an alternative embodiment of the present invention, shown in FIG. 4, fluid flow stream 60 is tangent to direction of UV tube or lamp 64. Anode wire 66 is disposed on the upstream side of UV lamp 64 and is preferably aligned parallel to UV lamp 64 (i.e. the length of the wire is perpendicular to the plane of the figure). Acid solution 67 generated at anode wire 66 and comprising one or more oxidants washes around UV lamp 64 as the fluid flow stream flow tangent to the orientation of UV lamp 64, thereby keeping the surface of UV lamp 64 clean of carbonate scale and biofilm. One or more cathode wires 68 are preferably aligned parallel to anode wire 66 and UV lamp 64. Dissolved solids in fluid stream 60 allow for an electrical conduction path between anode wire 66 and cathode wires 68 to facilitate production of acid fluids at anode wire 66. Anode wire 66 and cathode wires 68 are preferably held in position with respect to UV lamp 64 by virtue of non-conductive retainer 62 spaced along the length of UV lamp 64. The anode and cathodes may comprise conductive traces rather than wires, and the polarity may be reversed as desired to clean scale and biofilms from the cathodes.

The descaling process of the present invention is typically continuous when the water is treated by oxidants produced by electrolysis in addition to UV radiation, since the anode and cathode are being used continuously in that application. However, the present invention may also be used to periodically clean the surface of a UV tube, or other surface, if electrolysis is not part of the decontamination process, for example by applying power to the anode only during an automatic cleaning cycle.

Figure 5:
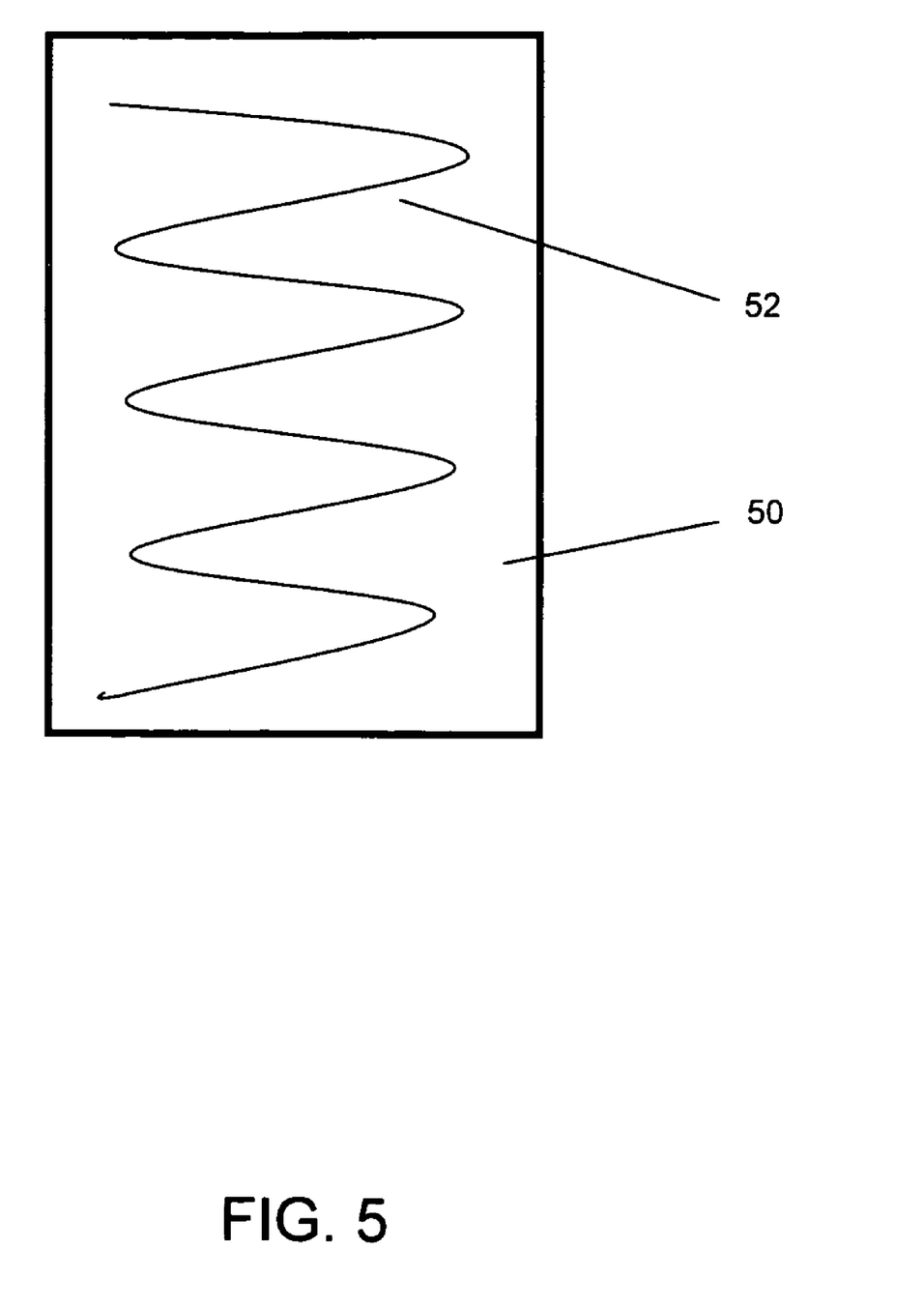
FIG. 5 is a depiction of an alternative embodiment of the present invention in which an anode is placed or deposited directly on a surface.

According to the previous embodiments, the anode may be suitably wrapped around any desired part to prevent surface build-up of undesirable materials such as scale. Alternatively the anode may be placed on any surface in the electrolytic cell for the same purpose, even if wrapping is not possible or desirable. FIG. 5 depicts a preferred embodiment of the present invention. Anode 52, which preferably comprises a wire, is placed adjacent to surface 50 in such a way as to ensure that a low pH conditions exist along substantially the entirety of surface 50. Anode 52 may alternatively comprise any conductive structure. Surface 50 may comprise any material, including but not limited to metal, glass, sapphire, quartz, and silicon. Anode 52 may be placed directly on surface 50 or may be separated from surface 50 by one or more spacers. For example, if surface 50 comprises an electrically conducting material, the spacers would preferably be electrically insulating.

Anode 52 may alternatively be deposited directly on surface 50 by evaporation, ink jet printing, direct writing, cold spray processing, or any other means known in the art. Any electrolytic anode material may be utilized for this purpose. For example, a diamond coating could be evaporated in a desired pattern on surface 50. Alternatively, a desired pattern is photo-etched on surface 50, titanium is deposited so as to conform to the etched pattern, and ruthenium is then deposited to form anode 52. Any combination of metals may be used as desired; for example, copper may first be deposited, conforming to the etched pattern, followed by plating or otherwise depositing titanium. Alternatively, the anode may be created when the surface is treated with ion bombardment. For example, a glass surface can be bombarded with a metal ion beam, either substantially completely or in a desired pattern, to create an anode that is still transparent to UV light but is conductive to electricity. For larger anode currents, surface 50 is preferably striped with heavy ion bombardment, which creates high conductivity paths for electricity that are reflective or otherwise block the UV light. Any of these processes may be extended to three dimensions so that an anode is deposited on all sides of a desired object, analogous to wrapping a wire around a tubular or cylindrical object as disclosed above, preferably by relative rotation of the part during deposition.

An example of such a surface is that of a water quality monitor, probe, or sensor, which may be used to measure pH, oxidation reduction potential, chlorine concentration, total dissolved solids (TDS), etc. It is common that sensors of this type become fouled by carbonate scale and biofilms, and eventually must be cleaned. By depositing or otherwise disposing an anode on or sufficiently near the surface of the sensor, scale and biofilms may either be periodically removed from the surface by activating the anode, for example during an automatic cleaning cycle, or be continuously cleaned to prevent scale and biofilms from forming.

Figure 6:
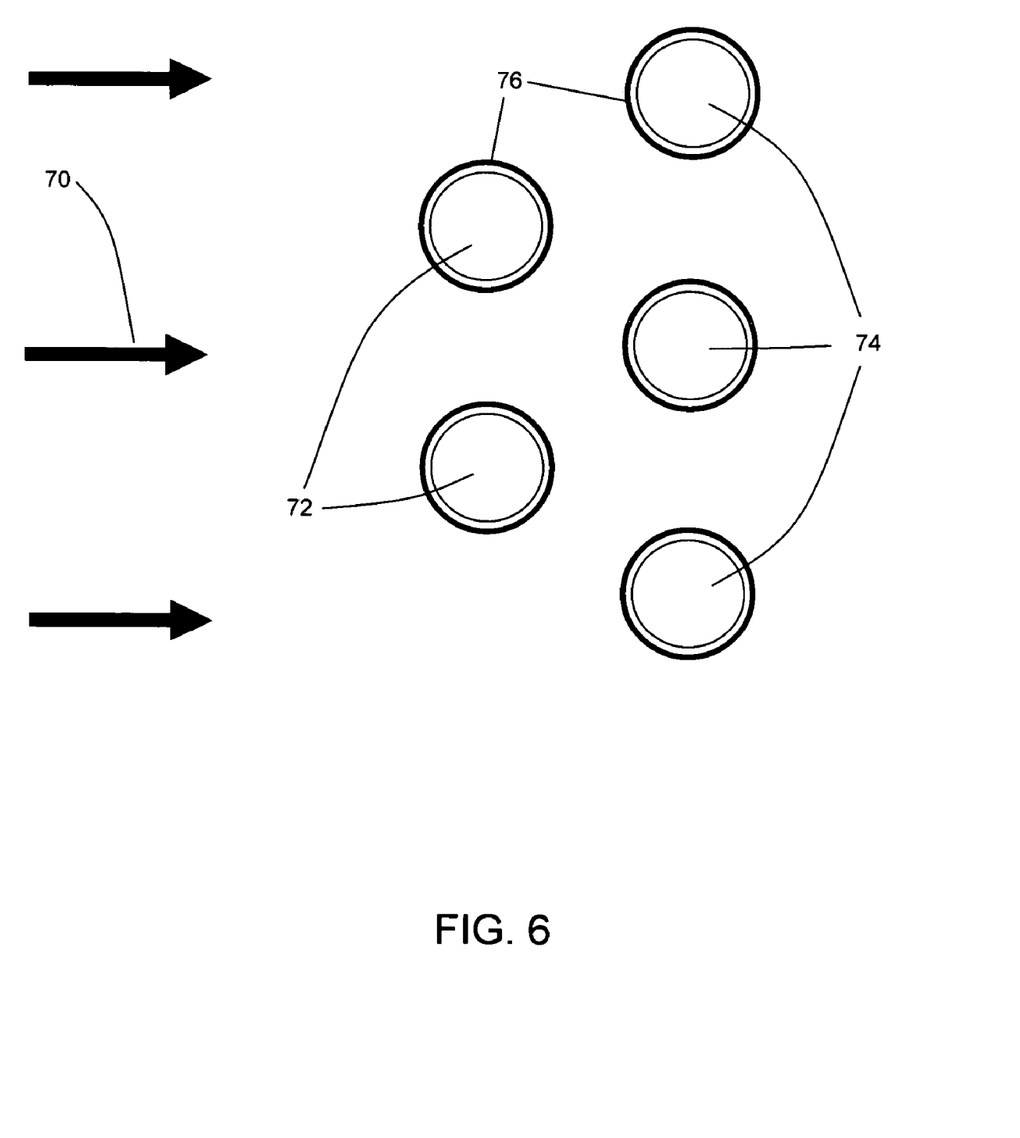
FIG. 6 shows a configuration of optically transparent, electrically conductive coated UV tubes mounted crossflow (or tangent) to the fluid flow stream.

Another application of directly depositing a conductive material on a surface to be descaled is shown in FIG. 6. Fluid flow stream 70 is flowing perpendicular to the direction of the longitudinal axis of UV tubes 72, 74, which are preferably coated with UV-transparent electrically conductive film 76. UV-transparent electrically conductive film 76 comprises, for example, a diamond film which is deposited on the surface of the UV lamps or tubes by a suitable means. Initially, UV-transparent electrically conductive film 76 acts as the anode on UV tubes 72, and as the cathode on UV tubes 74, when the appropriate relative voltages are applied. Alternatively, the cathodes may be wires or other conductive tracers, preferably separated from the anodic tubes at an appropriate spacing via one or more insulated spacers affixed to the UV tubes. In this configuration, UV tubes 72 are cleaned by the formation of acid solution at the surface of optically transparent electrically conductive film 76. After a desired period of time, the electrical polarity on optically transparent electrically conductive film 76 is reversed for UV tubes 72 and UV tubes 74. In this manner, film 76 on UV tubes 74 then acts as the anode and is cleaned by the anodic formation of acid solution, while film 76 on UV tubes 72 now acts as the cathode in the reaction. At prescribed intervals, the electrical polarity of film 76 is again preferably switched to alternately allow UV tubes 72 and UV tubes 74 to be cleaned. For hard water, alternating asymmetric current is preferably used, with periods ranging preferably from about 1 Hz to about 400 Hz.

In any of the above embodiments, two (or more) cathode wires or other cathodic traces or coated surfaces may optionally be used. Different voltages are applied to the cathode wires, both of which remain more negative with respect to the anode voltage. At the higher voltage cathode, a slightly acidic solution is produced which has a low enough pH to prevent scale formation, and a high pH solution is produced at the other cathode wire. By alternating the drip anode current and the return cathode current (i.e., reversing the polarity) on the set of cathode wires, the scale such as calcium carbonate or calcium sulfate is cleaned off both cathode wires alternately. Polarity reversal may be initiated when an additional voltage build up between the drip anode wire and return current wire due to scale build up is detected. For use in very hard water, the cathode surface may be allowed to soak in a dilute solution of hydrochloric acid or a weak solution of organic acid to dissolve the barium- or sulfate-based salt scale build up. Thus this system has the advantage that it can continue to be used as cleaning of one or the other cathode wires is occurring.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. An apparatus for reducing carbonate scale formation on a surface, the apparatus comprising:
   an object comprising a UV element for decontaminating a contaminated fluid;
   a power supply;
   a cathode; and
   an anode disposed on or near a surface of said object, said anode wrapped around said object, said anode and cathode electrolytically producing at least one oxidant to decontaminate the fluid;
   wherein said anode produces a low pH environment in the fluid at said surface, thereby inhibiting carbonate scale formation or reducing carbonate scale on the surface.

2. The apparatus of claim 1 wherein said UV element comprises a quartz tube.

3. The apparatus of claim 1 wherein said anode comprises a spirally wrapped wire.

4. The apparatus of claim 1 wherein said cathode comprises a housing.

5. The apparatus of claim 1 wherein said cathode comprises a spirally wrapped wire.

6. The apparatus of claim 1 wherein said cathode is separated from said anode by one or more nonconductive spacers.

7. The apparatus of claim 1 wherein said object is oriented transverse to a flow direction of the fluid.

8. The apparatus of claim 7 wherein said anode is disposed parallel to and upstream of said object.

9. The apparatus of claim 1 further comprising a second cathode at a voltage different than a voltage of said anode and a voltage of said cathode.

10. A method for reducing carbonate scale formation on a surface, the method comprising the steps of:
    providing a cathode;
    disposing an anode on or near a surface of an object comprising a UV element by wrapping a wire anode on the surface;
    contacting the anode and the surface with a contaminated fluid;
    electrolytically producing one or more oxidants using the cathode and anode;
    purifying the fluid using UV radiation from the UV element and the oxidants;
    producing a low pH environment in the fluid in the vicinity of the anode; and
    inhibiting formation of or removing carbonate scale, biofilms, or algae from the surface.

11. The method of claim 10 wherein the fluid comprises an aqueous solution.

12. The method of claim 10 further comprising the step of separating the cathode and the anode with a nonconductive spacer.

13. The method of claim 10 wherein the producing step is performed as part of a cleaning cycle.

14. The method of claim 10 further comprising the step of reversing the polarity of the anode and the cathode.

15. The method of claim 14 further comprising the step of removing scale from the cathode.

16. The method of claim 10 wherein the object comprises a UV tube.

17. The method of claim 10 further comprising the step of orienting the object transverse to a flow direction of the fluid.

18. The method of claim 17 further comprising the step of disposing the anode parallel to and upstream of the object.

19. The method of claim 18 further comprising the step of washing an acidic solution produced at the anode around the object.

20. The method of claim 10 further comprising the step of providing a second cathode at a voltage different than a voltage of the anode and a voltage of the cathode.

21. The method of claim 20 further comprising the step of reversing the polarity of the cathode and the second cathode.

22. A method for reducing carbonate scale formation on a surface, the method comprising the steps of:
    providing a cathode;
    disposing an anode on or near a surface of an object comprising a UV element by depositing the anode directly on the surface;
    contacting the anode and the surface with a contaminated fluid;
    electrolytically producing one or more oxidants using the cathode and anode;
    purifying the fluid using UV radiation from the UV element and the oxidants;
    producing a low pH environment in the fluid in the vicinity of the anode; and
    inhibiting formation of or removing carbonate scale, biofilms, or algae from the surface.

23. The method of claim 22 wherein the anode comprises a conductive UV-transparent material.

24. The method of claim 23 wherein the material comprises diamond.

25. The method of claim 22 further comprising the step of separating the cathode and the anode with a nonconductive spacer.

26. The method of claim 22 wherein the producing step is performed as part of a cleaning cycle.

27. The method of claim 22 further comprising the step of reversing the polarity of the anode and the cathode.

28. The method of claim 27 further comprising the step of removing scale from the cathode.

29. The method of claim 22 wherein the object comprises a UV tube.

30. The method of claim 22 further comprising the step of orienting the object transverse to a flow direction of the fluid.

31. The method of claim 30 further comprising the step of disposing the anode parallel to and upstream of the object.

32. The method of claim 31 further comprising the step of washing an acidic solution produced at the anode around the object.

33. The method of claim 22 further comprising the step of providing a second cathode at a voltage different than a voltage of the anode and a voltage of the cathode.

34. The method of claim 33 further comprising the step of reversing the polarity of the cathode and the second cathode.

35. An apparatus for reducing carbonate scale formation on a surface, the apparatus comprising:
- an object comprising a UV element for decontaminating a contaminated fluid;
- a power supply;
- a cathode; and
- an anode disposed on or near a surface of said object, said anode and cathode electrolytically producing at least one oxidant to decontaminate the fluid;
- wherein said anode comprises a conductive material deposited on said surface, said conductive material being UV-transparent and comprising diamond; and
- wherein said anode produces a low pH environment in the fluid at said surface, thereby inhibiting carbonate scale formation or reducing carbonate scale on the surface.

36. The apparatus of claim 35 wherein said UV element comprises a quartz tube.

37. The apparatus of claim 35 wherein said cathode comprises a housing.

38. The apparatus of claim 35 wherein said cathode comprises a spirally wrapped wire.

39. The apparatus of claim 35 wherein said cathode is separated from said anode by one or more nonconductive spacers.

40. The apparatus of claim 35 wherein said object is oriented transverse to a flow direction of the fluid.

41. The apparatus of claim 40 wherein said anode is disposed parallel to and upstream of said object.

42. The apparatus of claim 35 further comprising a second cathode at a voltage different than a voltage of said anode and a voltage of said cathode.

* * * * *